United States Patent [19]

Doty

[11] Patent Number: 5,312,122
[45] Date of Patent: May 17, 1994

[54] SHOPPING CART ATTACHMENTS

[76] Inventor: Raymond A. Doty, 32 Maple Ave., Hudson, N.Y. 12534

[21] Appl. No.: 999,093

[22] Filed: Dec. 31, 1992

[51] Int. Cl.⁵ .............................................. B62B 3/02
[52] U.S. Cl. ............................ 280/33.992; 280/33.993
[58] Field of Search ..................... 280/33.992, 33.993, 280/33.999; 446/227; 297/227

[56] References Cited

U.S. PATENT DOCUMENTS

| | | | |
|---|---|---|---|
| 1,318,024 | 10/1919 | Sundell | 446/227 |
| 2,282,881 | 5/1942 | Ostrow | 446/227 |
| 2,402,861 | 12/1943 | Winnick | 446/227 |
| 2,864,189 | 12/1958 | Campbell | 280/33.992 |
| 2,994,153 | 8/1961 | Zwolinski | 446/7 |
| 3,204,367 | 9/1965 | Stubbmann | 446/227 |
| 3,539,204 | 11/1970 | Keller | 280/33.992 |
| 4,805,937 | 2/1989 | Boucher et al. | 280/33.992 |

FOREIGN PATENT DOCUMENTS 2176332  12/1986  United Kingdom ........... 280/33.992

OTHER PUBLICATIONS

American Baby Magazine, Sep. 1992, p. 28.

Primary Examiner—Richard M. Camby
Attorney, Agent, or Firm—Schmeiser, Morelle & Watts

[57] ABSTRACT

A plurality of shopping cart attachments for facilitating the operation and improving the child carrying capabilities of existing shopping carts including a tandem child seat system for converting a shopping cart into a tandem shopping cart, a back guard/harness system for preventing a child from standing up and/or turning around while in a shopping cart child seat and a protective cart clip system for preventing a child from coming into contact with the germ laden handlebar area of a shopping cart.

4 Claims, 2 Drawing Sheets

SHOPPING CART ATTACHMENTS

FIELD OF THE INVENTION

The present invention relates to shopping carts and, more particularly, to attachments for facilitating the operation and improving the child carrying capabilities of existing shopping carts. The invention includes a tandem child seat system for converting a shopping cart into a tandem shopping cart, thereby allowing two children to be transported simultaneously therein, a unique back guard/harness system for preventing a child from standing up and/or turning around while in a shopping cart child seat and a protective cart clip system for preventing a child from coming into contact with the germ laden handlebar area of a shopping cart. In addition, the cart clip system may include a plurality of child amusement devices thereon for the entertainment of a child sitting in a shopping cart child seat.

BACKGROUND OF THE INVENTION

Although a shopping cart is one of the most necessary elements associated with a trip to a grocery store, department store, warehouse club or the like, it is generally loathed by the majority of shoppers because of its inevitably misaligned, squeaky, and/or sticky wheels. Unfortunately, parents who must bring along one or more children while shopping are faced with a plethora of additional difficulties associated with the majority of presently available shopping cart configurations.

A shopping cart typically includes a frame assembly for supporting a plurality of wheels, a frame assembly for supporting a large basket into which purchases are placed, and a rearwardly facing folding child seat located within the rear section of the basket proximate the handlebar of the shopping cart. The child seat generally includes a small plastic base section on which a child sits, leg openings for receiving the legs of a child therethrough, a waist belt for securing a child therein and a backrest for supporting the back of a child, wherein the backrest is formed by a series of spaced rails.

The handlebar area and the nearby frame components are typically the most touched sections of a shopping cart. For example, in a grocery store that is open around the clock, a particular shopping cart may be handled and utilized by a large number of customers and employees of the store. Consequently, if one of the persons handling a particular shopping cart is ill with a cold, the flu or some other contagious disease, the illness may be spread to many of the other persons who subsequently come in contact with that shopping cart. Analogously, a child sitting in the child seat of that shopping cart may also stand a great chance of becoming sick because they oftentimes touch, chew, and/or lick those areas of the cart which may already have been infected.

When a child is initially placed into the child seat of a shopping cart, they are usually fascinated or distracted by their surroundings and are therefore content to remain seated within the child seat. After a few minutes, however, a child tends to become bored with his or her surroundings and subsequently looks for other avenues of amusement. Unfortunately, any activity other than sitting down in the child seat may lead to injuries, accidents and/or other parental annoyances. For example, the child may attempt to stand up in the child seat which may lead to the child falling into the basket of the shopping cart, thereby damaging any purchases therein or injuring the child. Similarly, the child may stand up in the child seat and subsequently fall out of the shopping cart onto the floor of the store, the sidewalk or the parking lot, potentially resulting in a serious injury or even death. Although commonly available shopping carts are equipped with a waist belt to avert the above-described accidents from occurring, most parents can attest to the fact that a child can easily squirm out of the waist belt with a minimum amount of effort. A child may also attempt to turn partially or entirely around in the child seat in order to play with the backrest or the purchases stored in the basket. Quite often, a child who has successfully turned around in the child seat is prone to remove one or more items from the basket and subsequently throw them to the ground, thereby damaging the item and/or creating a mess. Depending upon the policy of each particular store, the parent or other child supervisory personnel may be required to compensate the store for the damaged items. A child may also be injured while playing with the backrest of the shopping cart child seat. For example, a child may break or otherwise injure his or her fingers by inserting them through the series of spaced rails which form the majority of presently available child seat backrests. In particular, if the person controlling the shopping cart is required to suddenly turn the cart in a new direction while a child is inserting his or her fingers between the spaced rails, the momentum of the child's body may exert sufficient pressure between the fingers and the rails to cause an injury.

Oftentimes a parent is faced with the very difficult task of supervising two young children while shopping in a grocery or department store. Unfortunately, currently available shopping carts are designed to only accommodate a single child, thereby requiring the parent to carry the second child, or if the second child has learned to walk, to allow that child to walk next to the parent. In this situation, the parent must shop and perform a number of potentially nerve racking tasks all at the same time. For example, the parent must ensure that the child sitting in the shopping cart child seat does not perform any of the above-described potentially dangerous activities. In addition, the parent must ensure that the child who is walking does not wander or run away, does not pull items from shelves of the store and/or does not create other types of havoc.

SUMMARY OF THE INVENTION

In order to avoid the disadvantages of the prior art, the present invention provides a plurality of shopping cart attachments including a tandem shopping cart child seat system, a back guard/harness system for securing a child within a shopping cart child seat, and a protective cart clip system for preventing a child from touching the handlebar area of a shopping cart. One or more of these systems may be attached to a shopping cart according to the particular needs of each shopping cart user. If required, the back guard/harness and the protective cart clip systems may also be secured to the tandem shopping cart child seat system.

The tandem shopping cart child seat system of the present invention, when detachably secured to any existing shopping cart, allows a shopper to simultaneously transport two children therein. In particular, the tandem child seat system, which may be constructed out of metal, plastic and/or other appropriate materials, includes an adjustable child seat frame assembly and a plurality of clamping elements for removably fastening the child seat frame assembly to the posterior section of a shopping cart.

The adjustable child seat frame assembly of the present invention includes an inverted U-shaped handlebar/support frame member, a pair of shopping cart attachment frame members, operatively connected to an intermediate section of the inverted U-shaped frame member and extending upwardly therefrom, for securing the inverted U-shaped frame member to the handlebar area of a shopping cart, a child support panel, operatively connected between the inverted U-shaped handlebar/support frame member and the pair of attachment frame members, for supporting a child thereon, and a pair of forwardly directed, telescopically adjustable spacers for securing a lower section of the inverted U-shaped frame member to a lower section of a shopping cart. The inverted U-shaped handlebar/support frame member includes a rearwardly directed and transversely positioned handlebar on an upper section thereof which may be utilized to push a shopping cart with the tandem shopping cart child seat system of the present invention attached thereto, and a pair of downwardly extending telescopically adjustable legs having a rotatable wheel assembly secured to the bottom thereof. The shopping cart attachment frame members, which have a child seat backrest fixedly secured therebetween, each include a removably securable handlebar mounting element such as a hook, clamp or the like proximate an upper section thereof which is adapted to be secured to the handlebar area of a shopping cart. Similarly, each of the forwardly directed, telescopically adjustable spacers includes a removably securable mounting element on a distal end thereof which is adapted to be secured to a lower portion of a shopping cart such as the basket supporting frame assembly.

In the preferred embodiment, the telescopically adjustable legs of the inverted U-shaped handlebar/support frame member and the telescopically adjustable spacers allow the tandem shopping cart child seat system of the present invention to be attached to a variety of different size shopping carts. Alternately, if the tandem child seat system is to be secured to identically sized shopping carts, the legs of the inverted U-shaped handlebar/support frame member and the spacers may be constructed in a nonadjustable manner. Also, in the preferred embodiment, the pair of shopping cart attachment frame members are pivotally connected to opposing sides of the inverted U-shaped frame member, the child support frame member is pivotally and/or movably connected to the pair of shopping cart attachment frame members and the inverted U-shaped frame member, and the spacers are pivotally connected to the downwardly extending legs of the inverted U-shaped frame member, thereby allowing the tandem child seat attachment to be easily collapsed for storage and transport.

The back guard/harness system includes a unitary continuous shield for covering substantially the entire width and/or height of the child seat backrest, thereby preventing a child from inserting his or her fingers or hands between the series of spaced rails which are commonly utilized in the construction of the backrest, and a plurality of adjustable straps for securing the shield to the backrest. In addition, the shield may be constructed so that it extends several inches above the top of the child seat backrest, thereby preventing a child from reaching over the top thereof. Preferably, the shield is constructed out of a transparent plastic material which allows a shopper to view the contents of the shopping cart basket therethrough, although the shield may be colored and/or may include an advertising logo or the like on one or both sides thereof. The back guard/harness may also include a plurality of adjustable length straps for securing a child thereto, thereby securing the child within the child seat. In particular, the back guard/harness system includes a pair of adjustable straps which are adapted to pass through a plurality of symmetrically oriented apertures in the shield and cross over the chest and/or shoulders of a child sitting in the shopping cart child seat. In addition, each of the straps includes a first and second end portion, each of which have a corresponding connecting element secured thereto. For example, the first end of each of the straps may include a male connecting element which is adapted to be inserted into a corresponding female connecting element located on the second end of each of the straps.

The back guard/harness system is adapted to be removably securable to the backrest of a shopping cart child seat or the backrest of the above-described tandem shopping cart child seat system. Alternately, the back guard/harness system may be fixedly integrated directly into a shopping cart or the tandem child seat system, over the backrest thereof.

The protective cart clip of the present invention, which may be formed from plastic or any other suitable material, includes an inverted V-shaped panel which is adapted to substantially cover the portion of a shopping cart or the tandem child seat system proximate the handlebar thereof, thereby preventing a child sitting in the child seat of the shopping cart or in the tandem child seat from touching or otherwise contacting the sections of the shopping cart which are typically covered with the highest concentration of germs. In particular, the inverted V-shaped panel includes first and second panel sections and a clamping element for securing the cart clip to the handlebar of a shopping cart or the handlebar of the tandem shopping cart child seat system, wherein the first panel section is adapted to substantially cover the upper and/or rearwardly extending handlebar section of the shopping cart and the second panel is adapted to extend several inches downward into the child seat, thereby covering additional germ laden areas of the shopping cart which are readily accessible to a child sitting in the child seat. Preferably, the clamping element is formed by convoluting an end section of the first panel, although any other appropriate clamping system may be utilized.

In order to entertain a child sitting in a shopping cart child seat or the tandem child seat system of the present invention, the cart clip may include a plurality of removably attachable child amusement devices thereon such as a toy steering wheel, a mirror, a rattle or the like. Analogously, the cart clip may include a plurality of attachments thereon such as a coupon holder, a calculator, a pencil holder or other paraphernalia which may be required by a shopper. The cart clip may also be utilized as a writing or organizational surface by reversing the orientation thereof relative to the shopping cart child seat or the tandem child seat system, wherein the second panel section of the inverted V-shaped panel is adapted to extend outward from the handlebar toward the person controlling the shopping cart.

DETAILED DESCRIPTION OF THE INVENTION

Figure 1:
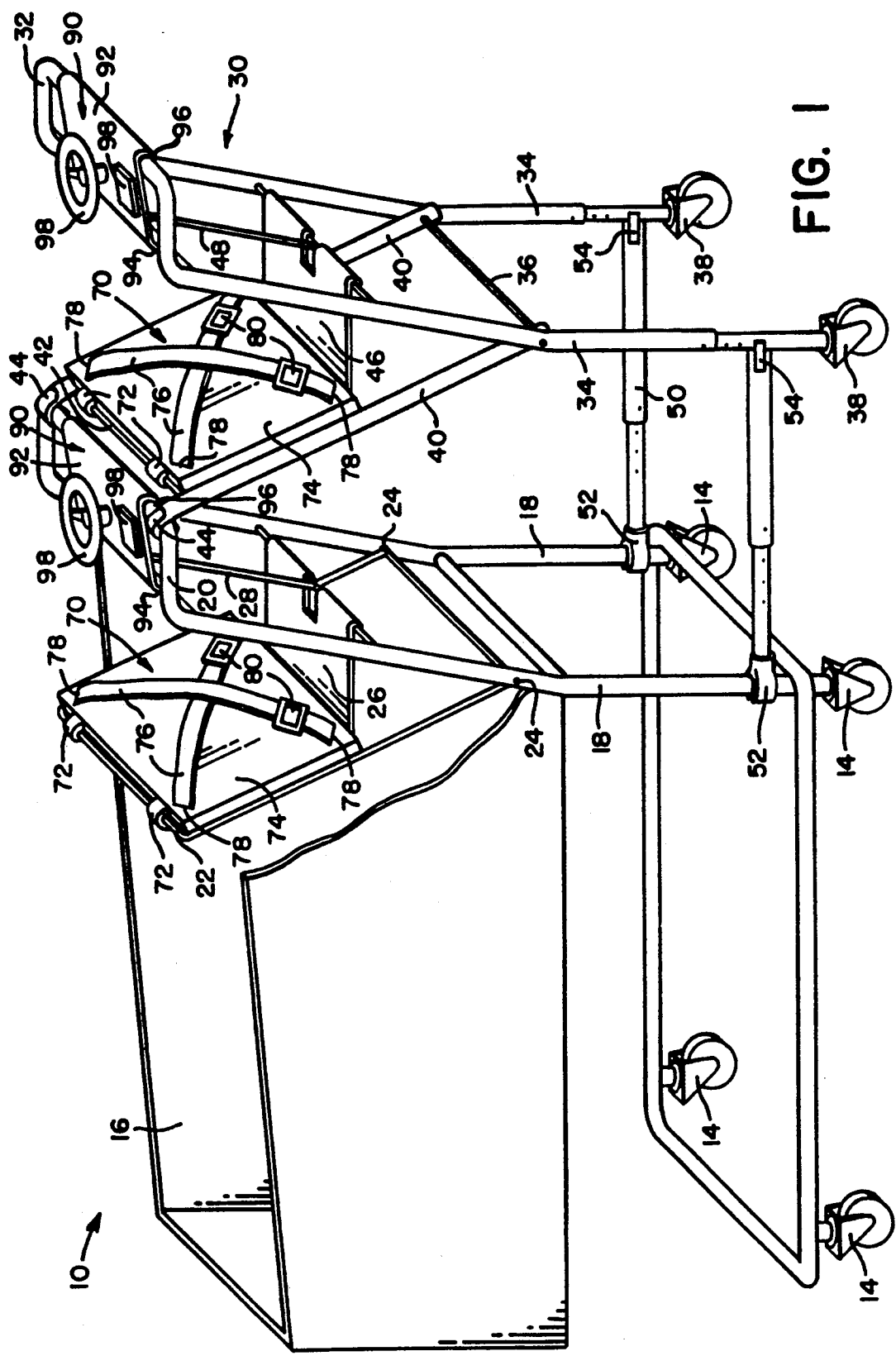
FIG. 1 is a perspective view of a shopping cart with the shopping cart attachments of the present invention fastened thereto.

Referring now to FIG. 1, there is illustrated a shopping cart 10 with the tandem shopping cart child seat system 30, back guard/harness system 70 and protective cart clip system 90 of the present invention secured thereon. Also, an additional back guard/harness system 70 and protective cart clip system 90 have been attached to the tandem child seat system 30.

The shopping cart 10 includes a wheel support frame 12 having a plurality of fully rotatable wheel assemblies 14 secured thereunder, a large basket 16 for storing purchases and an inverted U-shaped basket support frame assembly having a pair of upwardly extending leg members 18 and a handlebar 20. A child seat including a backrest 22, which is pivotally secured to the leg members 18 at pivot points 24, and a child support panel 26, which is pivotally secured to an inverted T-shaped crossbar assembly 28 and movably secured to the backrest 22, is located within the rear section of the basket 16.

As illustrated in FIG. 1, the tandem shopping cart child seat system 30 includes an inverted U-shaped handlebar/support frame having a rearwardly directed and transversely oriented handlebar 32 on an upper section thereof, a pair of downwardly extending telescopically adjustable legs 34, a crossbar 36 for maintaining the relative orientation of the adjustable legs 34, and a pair of fully rotatable wheel assemblies 38 operatively secured to the bottom of the adjustable legs 34.

A pair of upwardly extending shopping cart attachment frame members 40 having a backrest 42 secured therebetween are utilized to secure the inverted U-shaped handlebar/support frame to the handlebar 20 of the shopping cart 10. In particular, each of the shopping cart attachment frame members 40 include a removably securable handlebar mounting element 44 on an upper section thereof which is adapted to clamp over the shopping cart handlebar 20. The shopping cart attachment frame members 40 are pivotally secured to the crossbar 36 which is symmetrically secured to an intermediate section of each of the downwardly extending telescopically adjustable legs 34. The backrest 42 and a child support panel 46, which is pivotally secured to an inverted T-shaped crossbar 48 which extends between the pair of downwardly extending telescopically adjustable legs 34, form a child seat which is adapted to support a child therein.

Figure 3:
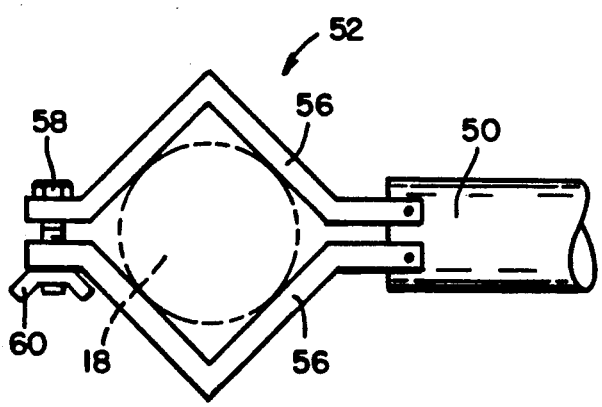
FIG. 3 is a plan view of a clamp for securing the tandem shopping cart child seat attachment to the downwardly extending rear legs of a shopping cart according to a first embodiment of the invention.
Figure 4:
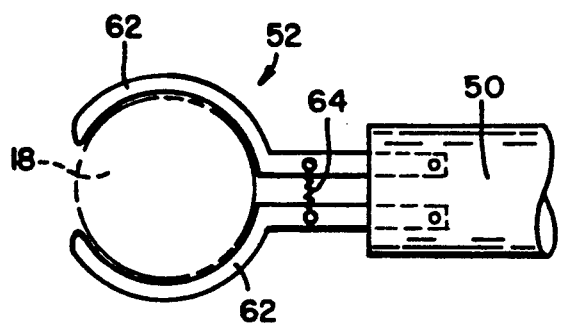
FIG. 4 is a plan view of a clamp for securing the tandem shopping cart child seat attachment to the downwardly extending rear legs of a shopping cart according to a second embodiment of the invention.

A pair of telescopically adjustable spacers 50 including a removably securable mounting element 52 on a distal end thereof are utilized to secure a lower section of each of the downwardly extending legs 34 of the inverted U-shaped handlebar/support frame to a lower section of the upwardly extending leg members 18 of the shopping cart 10. Each of the telescopically adjustable spacers 50 are pivotally secured to the lower section of a downwardly extending leg 34 with a clamping plate 54. As illustrated in FIG. 3, the mounting element 52 may include a pair of triangularly shaped clamps 56 which are adapted to be tightened about opposing sides of a leg member 18 with a bolt 58 and wing nut 60. Referring now to FIG. 4, there is illustrated a second embodiment of the mounting element 52, wherein a pair of arcuately shaped clamps 62 are tightened about opposing sides of a leg member 18 under control of a biasing spring 64.

Referring again to FIG. 1, there is illustrated a back guard/harness system 70 according to the present invention. In particular, the back guard/harness system includes at least two straps 72 for securing a unitary continuous shield 74 over the backrest 22 of the shopping cart 10 or the backrest 42 of the tandem shopping cart child seat system 30, and at least two adjustable length straps 76 for securing a child to the shield 74 thereby preventing the child from standing up and/or turning around in the shopping cart or in the tandem child seat system. In the preferred embodiments, each of the adjustable length straps 76 include first and second end portions which are adapted to pass through symmetrically oriented apertures 78 in the shield 74. The first and second end portions each include corresponding sections of a coupling system 80 which are adapted to be coupled together after the straps have been secured about the shoulders and/or torso of a child.

Figure 2:
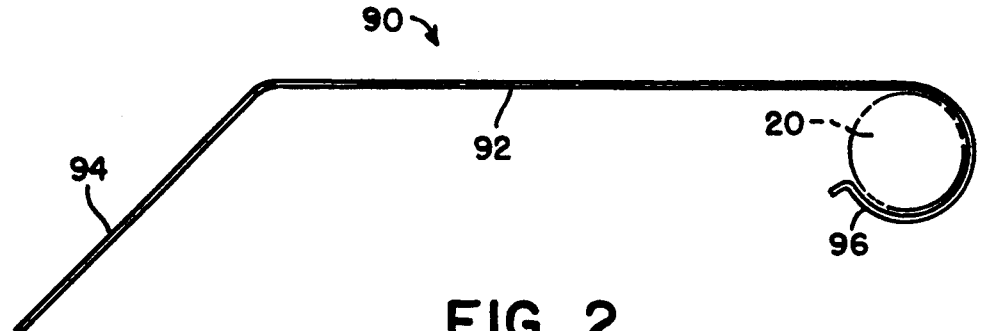
FIG. 2 is a side view of the cart clip attachment as secured to the handle of a shopping cart.

As illustrated in FIGS. 1 and 2, the protective cart clip system 90 of the present invention includes an inverted V-shaped panel composed of a first panel section 92 which is adapted to substantially cover the portion of the shopping cart 10 or the tandem child seat system 30 proximate the handlebars 20 and 32, respectively, and a second panel section 94 which is adapted to extend several inches downward into the shopping cart or tandem child seat system, thereby covering additional germ laden areas thereof. The inverted V-shaped panel includes a clamping element 96 formed by convoluting an end section of the first panel section 92, wherein the clamping element is adapted to be clamped onto the handlebar 20 of the shopping cart 10 or the handlebar 32 of the tandem child seat system 30. A plurality of child amusement devices 98 may be removably or fixedly secured to the upper surface of the protective cart clip system 90.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. In a shopping cart having a child seat and an adjacent, transversely disposed handlebar, a protective attachment for preventing a child disposed within said child seat from contacting said handlebar, comprising:

a unitary, inverted V-shape panel including first and second substantially planar, obtusely oriented panel sections, said first panel section substantially covering said handlebar and extending downwardly therefrom into said child seat, said second panel section extending downwardly from said first panel into said child seat, said first panel section including a substantially tubular, arcuate, transverse end section for removably securing said protective attachment over and around said handlebar.

2. The protective attachment according to claim 1 further including:
a plurality of child amusement devices disposed on an upper surface of said inverted V-shape panel, wherein said amusement devices are accessible to a child sitting in said child seat.

3. A tandem child seat attachment for a shopping cart, said shopping cart including a storage basket having a first child seat mounted therein, and a framework for supporting said storage basket, said framework including a plurality of wheels and a handlebar, comprising:
a second child seat for supporting a child in a sitting position, said second child seat extending externally outward from a posterior section of said shopping cart, said first and second child seats forming a tandem child seat arrangement;
said second child seat including:
a first, height adjustable, upwardly directed frame member, said first frame member including an upper, transversely disposed handlebar portion, and a bottom portion having at least one wheel;
a length adjustable spacer arrangement for maintaining said second child seat in a spaced apart relationship relative to the posterior section of said shopping cart, said spacer arrangement having a first end section pivotally secured to the bottom portion of said first frame member;
a first clamping arrangement for removably clamping a second, opposing end section of said spacer arrangement to the framework of said shopping cart, proximate the wheels thereof;
a second frame member, pivotally coupled to an intermediate portion of said first frame member and extending upwardly therefrom, said second frame member forming a backrest for supporting the back of a child;
a second clamping arrangement for removably clamping an upper portion of said second frame member to the handlebar of said shopping cart;
a third frame member, pivotally coupled between said first and second frame members, for supporting the buttocks of a child thereon;
said tandem child seat attachment further including:
a protective attachment for preventing a child sitting within said second child seat from contacting the upper, handlebar portion of said first frame member, said protective attachment including a unitary, inverted V-shaped panel including first and second substantially planar, obtusely oriented panel section, said first panel section substantially covering the handlebar portion of said first frame member and extending downwardly into said second child seat, said second panel section extending downwardly from said first panel into said second child seat, said first panel section including a substantially tubular, arcuate, transverse end section for removably securing said protective attachment over and around the handlebar portion of said first frame member; and
a unitary, continuous shield for substantially covering said backrest, said shield including a plurality of diagonally overlapping, adjustable straps for immobilizing a child thereagainst, said shield including a plurality of apertures for receiving said straps therethrough, said straps further including a plurality of complementary connecting elements for securing said straps around a front, upper torso section of a child.

4. The tandem child seat attachment for a shopping cart according to claim 3 further including:
a plurality of child amusement devices disposed on an upper surface of said protective attachment, wherein said amusement devices are accessible to a child sitting in said second child seat.

* * * * *